US006226435B1

(12) United States Patent
Hunsinger

(10) Patent No.: US 6,226,435 B1
(45) Date of Patent: May 1, 2001

(54) BULBOUS CONFIGURED FIBER OPTIC SPLICE CLOSURE AND ASSOCIATED METHODS

(76) Inventor: Terrance D. Hunsinger, 1413 Sitterson Dr., Raleigh, NC (US) 27603

( * ) Notice: Subject to any disclaimer, the term of this patent is extended or adjusted under 35 U.S.C. 154(b) by 0 days.

(21) Appl. No.: 09/303,888

(22) Filed: May 3, 1999

(51) Int. Cl.$^7$ ........................................... G02B 6/36
(52) U.S. Cl. .................................................. 385/135
(58) Field of Search .................................. 385/134–137

(56) References Cited

U.S. PATENT DOCUMENTS

| | | | |
|---|---|---|---|
| 4,761,052 | * 8/1988 | Buekers et al. | 385/135 |
| 4,961,623 | 10/1990 | Midkiff et al. | 350/96.2 |
| 5,042,901 | * 8/1991 | Merriken et al. | 385/135 |
| 5,121,458 | 6/1992 | Nilsson et al. | 385/100 |
| 5,375,185 | 12/1994 | Hermsen et al. | 385/135 |
| 5,428,705 | 6/1995 | Hermsen et al. | 385/135 |
| 5,479,553 | * 12/1995 | Daems et al. | 385/135 |
| 5,515,472 | 5/1996 | Mullaney et al. | 385/135 |
| 5,567,914 | 10/1996 | Minarovic et al. | 174/93 |
| 5,754,723 | 5/1998 | Fremgen | 385/135 |
| 5,825,963 | * 10/1998 | Burgett | 385/135 |
| 5,838,871 | * 11/1998 | Libert et al. | 385/135 |
| 5,997,186 | * 12/1999 | Huynh et al. | 385/99 |

FOREIGN PATENT DOCUMENTS

| 36 40836 C1 | 5/1988 | (DE) . |
|---|---|---|
| 295 19887 U1 | 5/1997 | (DE) . |

* cited by examiner

*Primary Examiner*—John D. Lee
*Assistant Examiner*—Michelle R. Connelly
(74) *Attorney, Agent, or Firm*—Allen, Dyer, Doppelt, Milbrath & Gilchrist, P.A.

(57) ABSTRACT

A splice closure includes a splice tray having a medial portion on which at least one optical fiber splice and any slack is contained thereon. The splice tray can be formed from a flexible material, such that the splice tray can be rolled upon itself and biased back into an unrolled condition after any rolling force is released. A bulbous configured closure has at least one opposing opening through which fiber optic cable to be spliced is received. The splice tray is received within the bulbous configured closure. The splice tray is biased into an unrolled condition within the bulbous configured closure to aid in maintaining a minimum bend radius of any fibers.

31 Claims, 3 Drawing Sheets

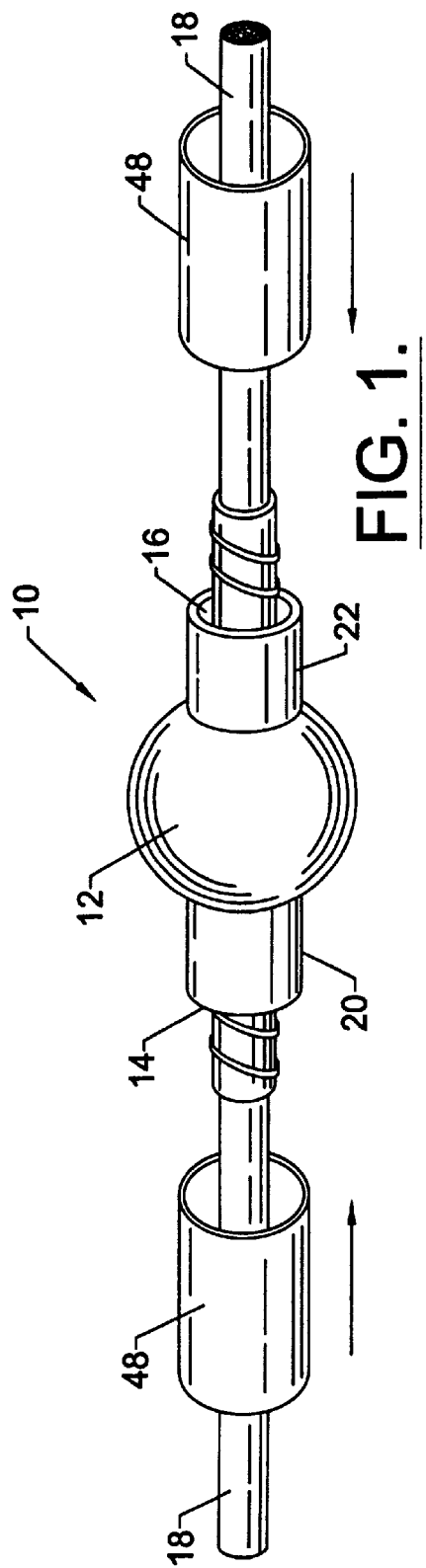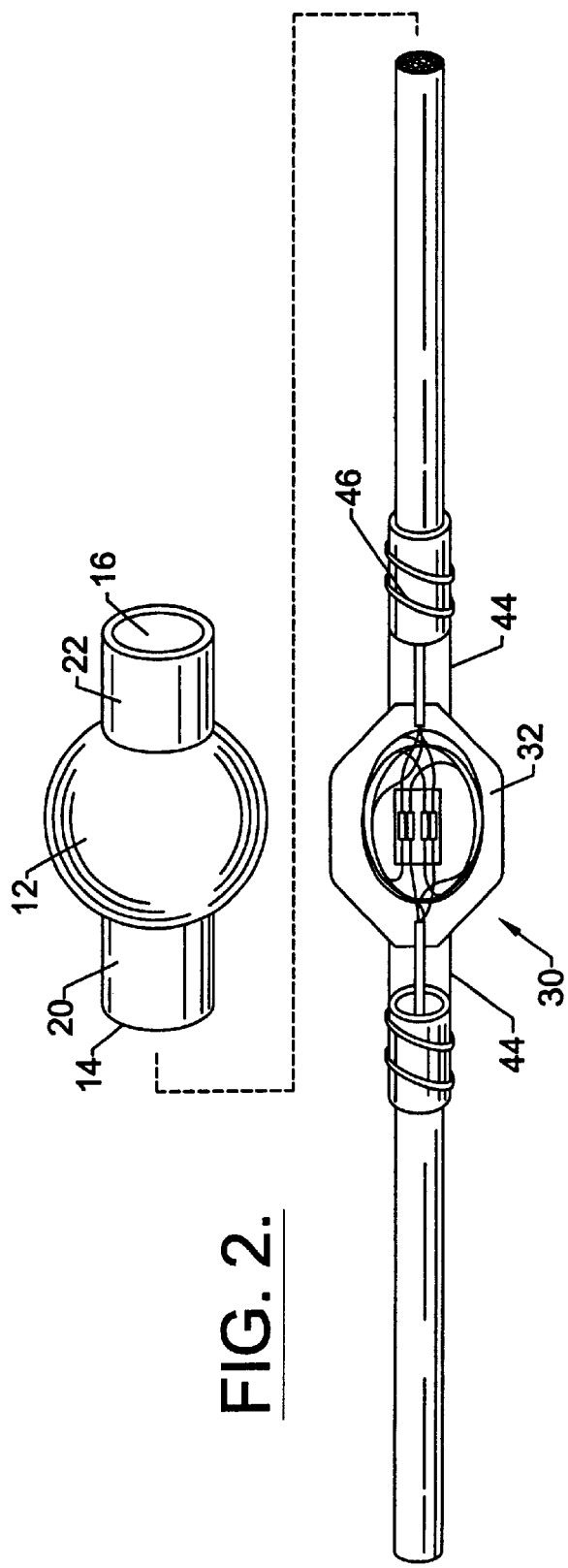

BULBOUS CONFIGURED FIBER OPTIC SPLICE CLOSURE AND ASSOCIATED METHODS

FIELD OF THE INVENTION

The invention relates to the field of optical communications, and more particularly, to a fiber optic splice closure and associated methods.

BACKGROUND OF THE INVENTION

Fiber optic cables are widely used to transmit communications signals over relatively long distances. A typical fiber optic cable includes a central core including a plurality of buffer tubes each, in turn, containing a plurality of individual optical fibers. The core also typically includes a central strength member. An outer plastic jacket may be provided over the core. Some cables may include a metallic layer beneath the plastic jacket to prevent rodent damage. Another type of cable includes optical fiber ribbons within an overall sheath. Each ribbon includes a plurality of individual fibers joined together in side-by-side relation.

Although an optical fiber cable can carry signals over relatively long distances without requiring repeaters, one common architecture includes one or more drop locations along a main cable route. In other words, it may be desirable to connect certain fibers to drop cables along the main cable route. Each such drop or splice point requires the protection of the cable ends and individual splices. More particularly, a splice closure is typically provided for terminating the cables and storing the splices. It is also important to maintain any minimum bend radius with optical fibers.

Besides the use of fiber optic cable, copper cable is also sometimes used either alone or in conjunction with fiber optic cable. These are also often used in drop splice closures, such as used in residential areas. Many closures are complicated and expensive.

SUMMARY OF THE INVENTION

It is therefore an object of the present invention to provide a splice closure, such as useful for fiber optics and copper applications, that is inexpensive and efficient to use in the field.

It is still another object of the present invention to provide a splice closure that is inexpensive and efficient to use in the field and aids in maintaining a minimum bend radius of any optical fibers.

In accordance with the present invention, a splice closure includes a splice tray having a medial portion on which at least one optical fiber splice and any slack is contained therein. The splice tray is formed from a flexible material so that the splice tray can be rolled upon itself and biased back into an unrolled condition after any rolling force is released. A bulbous configured closure has at least one opening through which the fiber optic cable to be spliced is received. The bulbous configured closure contains the splice tray after the splice tray and any optical fiber splice thereon has been received within the opening in a rolled condition, such that the splice tray is biased into an unrolled condition within the bulbous configured closure to aid in maintaining a minimum bend radius of any optical fibers. One opening could be advantageous for a butt splice configuration, while two opposing openings could also be used.

In still another aspect of the present invention, the splice tray further includes opposing stiff portions on which fiber optic cable is secured. The stiff portions can include clamps positioned for securing the fiber optic cable at the stiff portions. The bulbous configured closure can be substantially globular shaped, preferably spherical, although it could be oval or other shapes. The splice tray is preferably formed from a plastic material, as well as the bulbous configured closure. A seal, and in one aspect a heat shrink, is positioned at the opening of the bulbous configured closure for sealing the openings.

In still another aspect of the present invention, the splice tray has a substantially planar configured medial portion defined by upper and lower opposing sides and formed from a flexible material, such that the splice tray can be rolled upon itself and biased back into an unrolled condition after any rolling force is released. The upper side contains at least one optical fiber splice and any slack contained thereon. The lower side is adapted to contain at least one copper splice. The splice tray has opposing stiff portions on which fiber/copper cables are secured.

In still another aspect of the present invention, the bulbous configured closure is formed from plastic and has two opposing tubular configured extensions forming openings into the interior of the bulbous configured closure through which fiber/copper cable to be spliced is received. If only one opening is used, then only one tubular extension is used.

In a method aspect of the present invention, a method of forming a splice closure comprises the steps of splicing optical fiber received from two fiber optic cables on a medial portion of the splice tray that is formed from a flexible material, such that the splice tray can be rolled upon itself and biased back into an unrolled condition after any rolling force is released. The splice tray is rolled upon itself and inserted into an opening of a bulbous configured closure having opposing openings, such that each respective fiber optic cable extends out of the opening of the bulbous configured closure. The splice tray is biased into an unrolled condition within the interior of the bulbous configured closure to aid in maintaining a minimum bend radius of any fibers.

In still another aspect of the present invention, the method comprises the step of securing the fiber optic cable to opposing stiff portions formed on the splice tray. The method also comprises the step of sealing the openings of the splice closure with heat shrink. The method also comprises the step of sliding the bulbous configured closure onto a fiber optic cable before splicing. The method also comprises the step of sliding a heat shrink tube onto respective fiber optic cables before splicing.

BRIEF DESCRIPTION OF THE DRAWINGS

Other objects, features and advantages of the present invention will become apparent from the detailed description of the invention which follows, when considered in light of the accompanying drawings in which:

FIG. 1 is a perspective view of a completed splice closure of the present invention, before the tubular heat shrinks have been positioned at each opening.

FIG. 2 is another perspective view showing the splice tray separated from the bulbous configured closure.

DETAILED DESCRIPTION OF THE PREFERRED EMBODIMENTS

Figure 3:
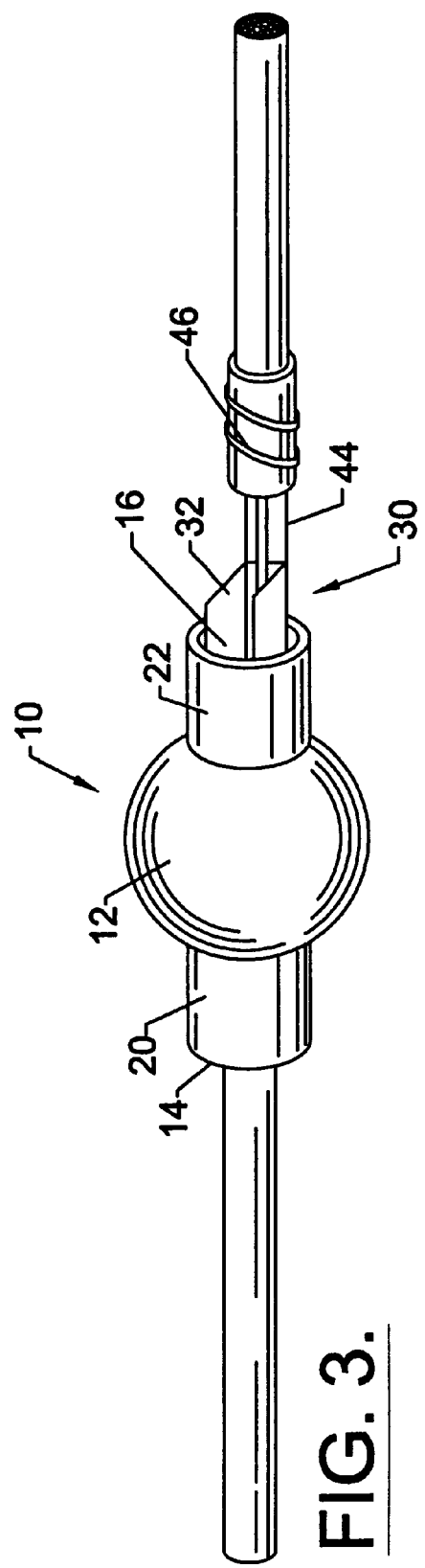
FIG. 3 shows how the splice tray is rolled upon itself and inserted within one of the tubular configured extensions.

Referring now to FIG. 1, there is shown a completed splice closure 10 of the present invention. A bulbous configured closure 12 has two opposing openings 14,16 through which fiber optic cable 18 to be spliced is received. Although two openings are illustrated, it is possible to have one opening only for a butt splice configuration, where fiber optic cables extend into the one opening. The bulbous configured closure 12, in one aspect of the present invention, is substantially globular shaped, and more particularly, spherical. It can also be formed as oval or other configurations suggested to those skilled in the art. It is typically formed from a rigid material, such as from a plastic resin, and includes two opposing tubular configured extensions 20,22 formed from a plastic or similar material, where the openings 14,16 extend into the interior of the bulbous configured closure. The materials used for construction can be chosen from those materials known from the prior art. Although a fiber optic cable is illustrated, any type of cable can be used in accordance with the present invention, including fiber optic cable, copper cable and any other type of fiber/copper cable having strands and individual fibers that have to be spliced.

Figure 4:
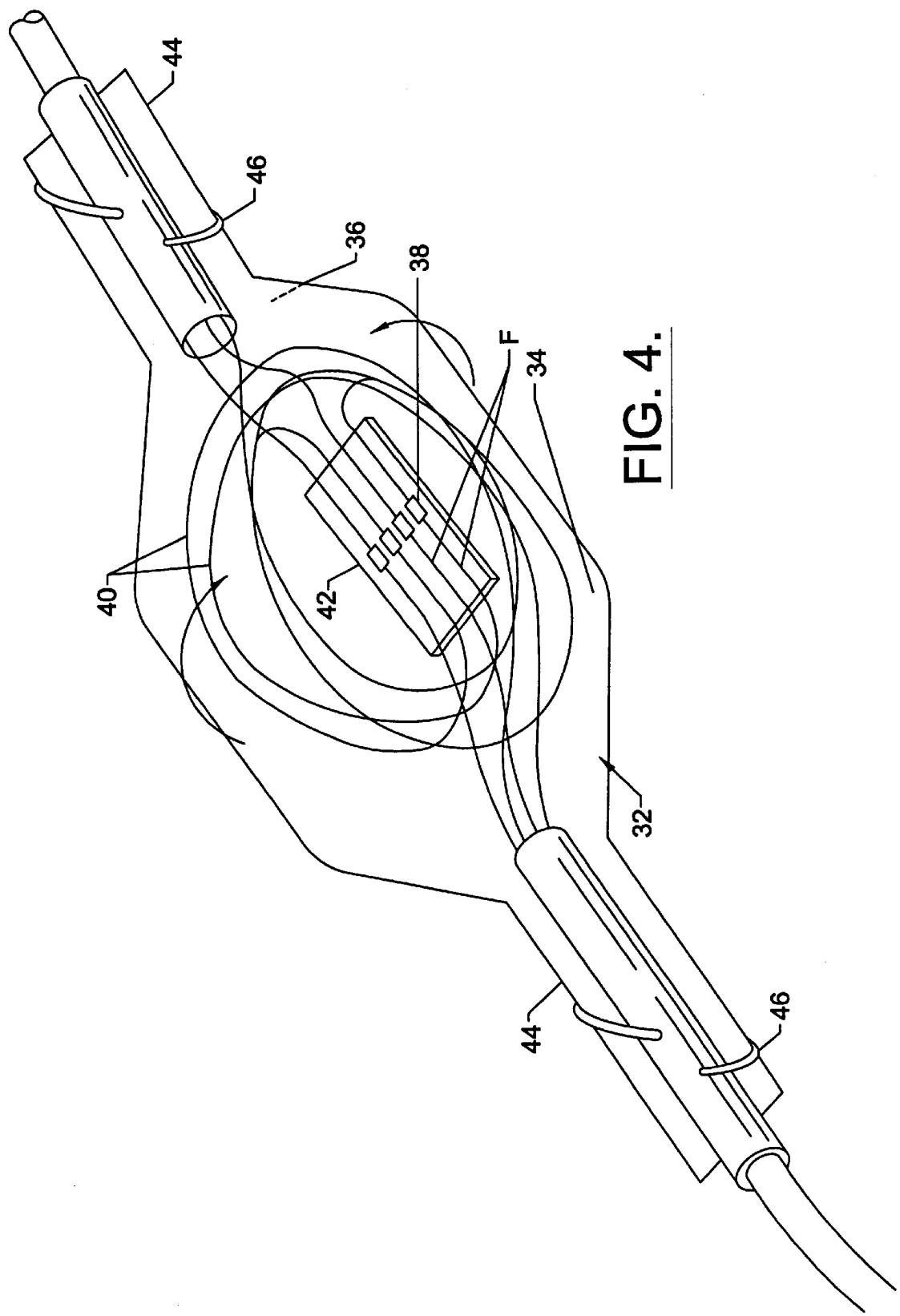
FIG. 4 is a schematic diagram of a splice tray that can be used with the present invention.

As shown in FIGS. 2 and 4, a splice tray 30 has a substantially planar configured medial portion 32 defined by upper and lower opposing sides 34,36 and formed from a flexible material, such as plastic. Naturally, any type of plastic or other flexible material known to those skilled in the art can be used. Each splice tray 30 can be rolled upon itself and by its construction, is biased back into an unrolled condition after any rolling force is released. The upper side 34 contains at least one optical fiber splice 38 and any slack 40 contained thereon as shown in FIG. 4. Additionally, the medial portion 32 can include a splice holder 42 on the medial portion of the upper side to hold the optical fiber splices 38. Individual optical fibers (F) are spliced on the splice holder 42 that is held on the splice tray. The splice holder 42 can be those types of splice holders known to those skilled in the art. The lower side 36 of the splice tray 30 can contain at least one copper splice using copper splicing techniques known to those skilled in the art. In accordance with the present invention, the splice tray 30 has opposing stiff portions 44 on which fiber optic cables can be secured, such as by a clamp 46, shown in FIGS. 2 and 4. The stiff portions 44 can be tubular formed as shown in FIG. 2. In this manner, the clamp can retain the stiff portions against the fiber optic cable 18. The stiff portions 44 can be formed by adding a stiffer layer of plastic or other manufacturing techniques known to those skilled in the art.

As shown in FIG. 1, a seal in the form of heat shrink material 48 can be positioned on the fiber optic cables 18 and then slid onto the ends of the bulbous configured closure and heat shrunk to seal the splice closure 10. Although a plastic heat shrink is illustrated, any mechanical seal that protects against the environment can be used. In a method aspect of the present invention, the bulbous configured closure 12 can be received over one of the fiber optic or cables 18 to be spliced. The optical fibers (or copper wires) received from the cable 18 then are spliced on a medial portion 32 of the splice tray 30. The splice tray 30 is rolled upon itself and then inserted into an opening 14 or 16 of the bulbous configured closure 12. Naturally, one hand of a user can grasp a cable and the other hand can slide the bulbous configured closure 12 onto the stiff portion 44 on which fiber optic cable 18 is secured. Before the bulbous configured closure has been slid, the cable 18 could be secured to the stiff portion 44 by placing clamps 46 onto the stiff portions and cable. Once the bulbous configured closure 12 is received over the splice tray 30, the heat shrink material can be slid onto the tubular extensions 20,22 and then heat shrunk. Also, it is possible to place the heat shrink around the ends as a separate wrap and then heat shrink the material.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A fiber optic splice closure comprising:

a splice tray having a medial portion on which at least one optical fiber splice and any slack is contained thereon, and formed from a flexible material such that the splice tray can be rolled upon itself and biased back into an unrolled condition after any rolling force is released; and a bulbous configured closure having at least one opening through which fiber optic cable to be spliced is received, and containing said splice tray after said splice tray and any optical fiber splice thereon has been received in a rolled condition such that said splice tray is biased into an unrolled condition within said bulbous configured closure to aid in maintaining a minimum bend radius of any fibers.

2. A splice closure according to claim 1, wherein said splice tray further comprises opposing stiff portions on which fiber optic cable is secured.

3. A splice closure according to claim 2, wherein said stiff portions include clamps positioned for securing said fiber optic cable to said stiff portions.

4. A splice closure according to claim 1, wherein said bulbous configured closure is substantially globular shaped.

5. A splice closure according to claim 4, wherein said globular shaped closure is substantially spherical.

6. A splice closure according to claim 1, wherein said splice tray is formed from a flexible plastic material.

7. A splice closure according to claim 1, wherein said bulbous configured closure is formed from a plastic material.

8. A splice closure according to claim 1, and further comprising a seal positioned at said opening of said bulbous configured closure for sealing the opening against the environment.

9. A splice closure according to claim 1, wherein said bulbous configured closure includes two opposing openings.

10. A splice closure comprising:

a splice tray having a substantially planar configured medial portion defined by upper and lower opposing sides and formed from a flexible material such that the splice tray can be rolled upon itself and biased back into an unrolled condition after any rolling force is released, wherein said upper side contains at least one optical fiber splice and any slack contained thereon, and said lower side is adapted to contain at least one copper splice, said splice tray having opposing stiff portions on which fiber/copper cables are secured; and a bulbous configured closure having at least one opening through which fiber/copper cable to be spliced is received, and containing said splice tray after said splice tray and splices have been received within said opening in a rolled condition such that said splice tray is biased into an unrolled condition within said bulbous configured closure to aid in maintaining any minimum bend radius of any optical fibers.

11. A splice closure according to claim 10, wherein said stiff portions include clamps positioned for securing said fiber/copper cable to said stiff portions.

12. A splice closure according to claim 10, wherein said bulbous configured closure is substantially globular shaped.

13. A splice closure according to claim 12, wherein said globular shaped closure is substantially spherical.

14. A splice closure according to claim 10, wherein said splice tray is formed from a flexible plastic material.

15. A splice closure according to claim 10, wherein said bulbous configured closure is formed from a plastic material.

16. A splice closure according to claim 10, and further comprising a seal positioned at said opening of said bulbous configured closure for sealing the opening against the environment.

17. A splice closure according to claim 10, wherein said bulbous configured closure includes two opposing openings.

18. A splice closure comprising:

a splice tray having a substantially planar configured medial portion defined by upper and lower opposing sides and formed from a flexible material such that the splice tray can be rolled upon itself and biased back into an unrolled condition after any rolling force is released, wherein said upper side contains at least one optical fiber splice and any slack contained thereon, and said lower side is adapted to contain at least one copper splice, said splice tray having opposing stiff portions on which fiber/copper cables are secured; and a bulbous configured closure formed from a plastic material and having at least one tubular configured extension forming an opening into the interior of the bulbous configured closure through which fiber/copper cable to be spliced is received, and containing said splice tray after said splice tray and splices have been received within said opening in a rolled condition such that said splice tray is biased into an unrolled condition within said bulbous configured closure to aid in maintaining any minimum bend radius of any optical fibers.

19. A splice closure according to claim 18, wherein said splice tray further comprises opposing stiff portions on which fiber/copper cable is secured.

20. A splice closure according to claim 19, wherein said stiff portions include clamps positioned for securing said fiber/copper cable to said stiff portions.

21. A splice closure according to claim 18, wherein said bulbous configured closure is substantially globular shaped.

22. A splice closure according to claim 21, wherein said globular shaped closure is substantially spherical.

23. A splice closure according to claim 22, wherein said splice tray is formed from a flexible plastic material.

24. A splice closure according to claim 18, wherein said bulbous configured closure is formed from a plastic material.

25. A splice closure according to claim 24, and further comprising a seal positioned at said opening for sealing the opening against the environment.

26. A splice closure according to claim 24, wherein said bulbous configured closure includes two opposing openings.

27. A method of forming a splice closure comprising the steps of:

splicing optical fiber received from two fiber optic cables on a medial portion of a splice tray that is formed from a flexible material such that the splice tray can be rolled upon itself and biased back into an unrolled condition after any rolling force is released;

rolling the splice tray upon itself; and inserting the rolled splice tray into an opening of a bulbous configured closure such that each respective fiber cable extends out of an opening of the bulbous configured closure and the splice tray is biased into an unrolled condition within the interior of the bulbous configured closure to aid in maintaining a minimum bend radius of any optical fibers.

28. A method according to claim 27, and further comprising the step of securing the fiber cable to opposing stiff portions formed on the splice tray.

29. A method according to claim 27, and further comprising the step of sealing the opening of the splice closure with a heat shrink.

30. A method according to claim 27, and further comprising the step of sliding the bulbous configured closure onto a fiber cable before splicing.

31. A method according to claim 27, and further comprising the step of:

sliding at least one heat shrink tube onto respective fiber optic cables before splicing;

sliding the heat shrink tube onto the opening of the bulbous configured closure after the splice tray is received into the bulbous configured closure; and heat shrinking the heat shrink tube.

* * * * *